United States Patent
Balmakhtar et al.

(10) Patent No.: US 10,455,062 B1
(45) Date of Patent: Oct. 22, 2019

(54) NETWORK FUNCTION VIRTUALIZATION (NFV) MULTI-PROTOCOL VIRTUAL PROBE CONTROL

(71) Applicant: Sprint Communications Company L.P., Overland Park, KS (US)

(72) Inventors: Marouane Balmakhtar, Alexandria, VA (US); Aaron Paul Hinkle, Centreville, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 184 days.

(21) Appl. No.: 15/393,459

(22) Filed: Dec. 29, 2016

(51) Int. Cl.
*H04L 29/06* (2006.01)
*H04W 80/04* (2009.01)

(52) U.S. Cl.
CPC .............. *H04L 69/18* (2013.01); *H04L 69/22* (2013.01); *H04W 80/045* (2013.01)

(58) Field of Classification Search
CPC ....... H04L 69/22; H04L 69/18; H04W 80/045
See application file for complete search history.

(56) References Cited

U.S. PATENT DOCUMENTS

| | | | |
|---|---|---|---|
| 8,600,792 B2 | 12/2013 | Drittler et al. | |
| 8,818,760 B2 | 8/2014 | Shannon et al. | |
| 9,210,061 B2 | 12/2015 | Richards et al. | |
| 9,311,160 B2 | 4/2016 | Parker | |
| 2007/0110053 A1* | 5/2007 | Soni | H04L 63/0263 370/389 |
| 2014/0201374 A1 | 7/2014 | Ashwood-Smith et al. | |
| 2014/0317261 A1 | 10/2014 | Shatzkamer et al. | |
| 2015/0063166 A1 | 3/2015 | Sif et al. | |
| 2015/0110113 A1* | 4/2015 | Levy | H04L 45/745 370/392 |
| 2015/0124622 A1 | 5/2015 | Kovvali et al. | |
| 2015/0149613 A1 | 5/2015 | Kakadia et al. | |
| 2015/0180730 A1 | 6/2015 | Felstaine et al. | |
| 2015/0263979 A1 | 9/2015 | Kasturi | |
| 2016/0099857 A1 | 4/2016 | Begwani et al. | |
| 2016/0285704 A1* | 9/2016 | Gasparakis | H04L 41/142 |

FOREIGN PATENT DOCUMENTS

| | | |
|---|---|---|
| WO | 2015061353 | 4/2015 |
| WO | 2015101153 | 7/2015 |
| WO | 2015135611 | 9/2015 |
| WO | 2015143610 | 10/2015 |
| WO | 2015183940 | 12/2015 |
| WO | 2016037479 | 3/2016 |

\* cited by examiner

*Primary Examiner* — Zhensheng Zhang

(57) ABSTRACT

A Network Function Virtualization (NFV) system controls multi-protocol virtual Probes (vProbes). A vProbe controller transfers protocol data and correlated header separation instructions to a vProbe in an NFV Infrastructure (NFVI). The vProbe receives the header separation instructions and the correlated protocol data. The vProbe receives data packets from an NFV switching system and identifies protocol data for the data packets. The vProbe uses the protocol data to determine the correlated header separation instructions. The vProbe retrieves header data from the data packets based on the header separation instructions and transfers the retrieved header data based on the header separation instructions.

16 Claims, 6 Drawing Sheets

| DATA STRUCTURE 300 | | |
|---|---|---|
| PROTOCOL DATA | HEADER SEPERATION | HEADER FORWARDING |
| IP ADDRESS A | BITMASK F | IP=A.B.C.D |
| OPEN FLOW V.4 | BITMASK G | IP=A.B.C.D |
| GTP TUNNEL C | BYTES:45-67; 89-125 | IP=E.F.G.H |
| SIP SIGNALING | BYTES:234-345; 456-567 | IP=E.F.G.H |
| LTE S1-MME SIGNALING | OFFSETS 12-34; 45-67 | IP=W.X.Y.Z |
| EHTERNET MAC D | OFFSETS 0-12; 50-150 | VNFM X |
| TCP + IP ADDRESS E | OFFSET 0-2056 | URI K |

FIGURE 3

NETWORK FUNCTION VIRTUALIZATION (NFV) MULTI-PROTOCOL VIRTUAL PROBE CONTROL

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Network Function Virtualization (NFV) computer systems are used to host data communication systems and deliver their data communication services.

NFV computer systems have Virtual Network Functions (VNFs) that perform data networking tasks. The NFV computer systems execute the VNFs under the control of virtualization software like hypervisors. The VNFs communicate with one another over NFV virtual Switches (vSWs). The VNFs also communicate with external systems over the NFV vSWs.

To implement a data communication service, an NFV Management and Orchestration (MANO) system directs the virtualization software to drive the execution of VNFs based on various descriptors for the data communication service. In a Software Defined Network (SDN), the VNFs may be SDN applications, SDN controllers, and virtual SDN data machines. The executing VNFs drive the delivery of the data communication services. The MANO system may scale the data communication system by adding and removing VNFs. The MANO system may scale the VNFs by adding and removing their computer hardware resources and virtual layer components like virtual switches and load balancers.

The data communication systems deploy NFV virtual Probes (vProbes) in the NFV to retrieve select data from the headers of a user data flow. In a typical application, a vProbe is deployed to slice packet headers from the data packet and forward the packet headers to a header analysis system. The NFV vProbes are deployed on a per-protocol basis and are pre-configured to identify the desired header data.

Unfortunately, a vProbe that is configured to process one protocol may not be adept at handling other protocols. For example, a vProbe that processes Internet Protocol (IP) packets to retrieve a specific destination IP prefix and its hop counts would not efficiently process Ethernet frames to retrieve Media Access Control (MAC) identifiers and their Virtual Local Area network (VLAN) identifiers. Moreover, vProbes that handle IP and Ethernet packets are not effective when handling application-specific protocols like Long Term Evolution (LTE) signaling and General Packet Radio Service Transfer Protocol (GTP) tunneling.

Technical Overview

A Network Function Virtualization (NFV) system controls multi-protocol virtual Probes (vProbes). A vProbe controller transfers protocol data and correlated header separation instructions to a vProbe in an NFV Infrastructure (NFVI). The vProbe receives the header separation instructions and the correlated protocol data. The vProbe receives data packets from an NFV switching system and identifies protocol data for the data packets. The vProbe uses the protocol data to determine the correlated header separation instructions. The vProbe retrieves header data from the data packets based on the header separation instructions and transfers the retrieved header data based on the header separation instructions.

DESCRIPTION OF THE DRAWINGS

FIG. 3 illustrates a data structure to correlate protocol data with header processing instructions in a vProbe.

DETAILED DESCRIPTION

Figure 1:
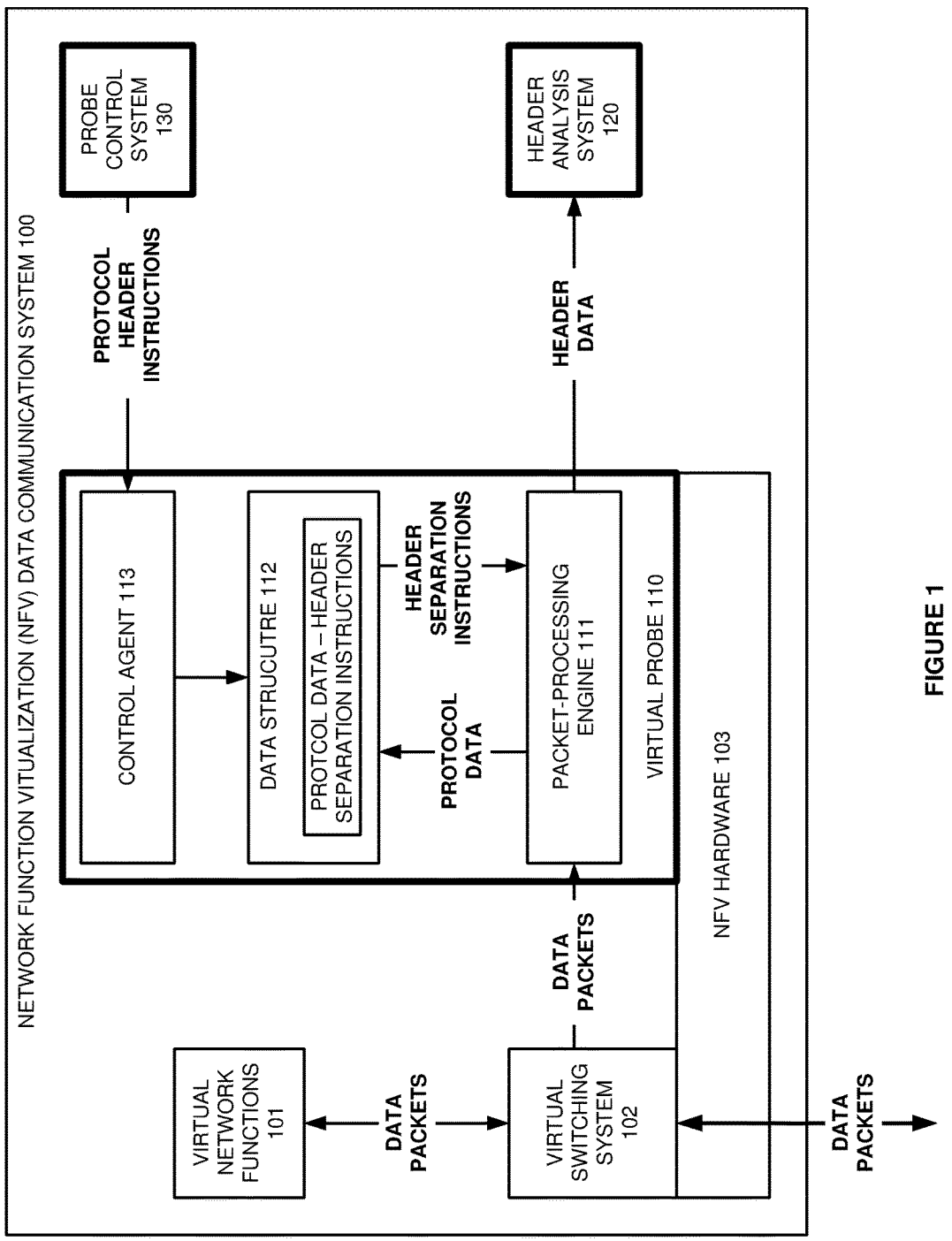
FIGS. 1-2 illustrate a Network Function Virtualization (NFV) data communication system that has multi-protocol virtual Probes (vProbes) to perform header data retrieval for multiple data communication protocols.
Figure 2:
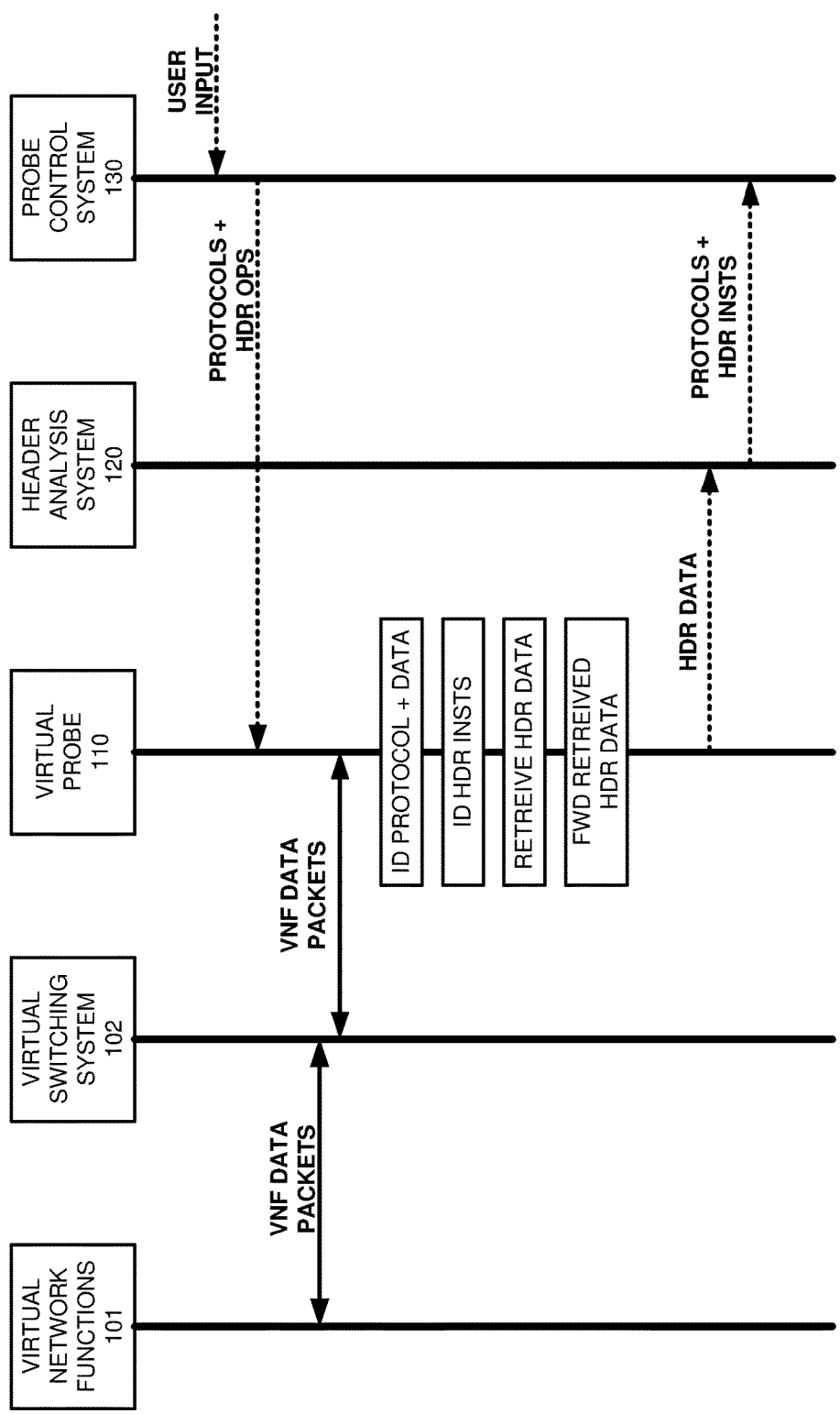

FIGS. 1-2 illustrate Network Function Virtualization (NFV) data communication system 100 that has multi-protocol virtual Probes (vProbes) to perform header data retrieval for multiple data communication protocols. NFV data communication system 100 exchanges user data for user devices like computers, phones, or some other intelligent machines. The data exchange supports data services such as content streaming, media conferencing, machine communications, internet access, or some other computerized information service. NFV data communication system 100 comprises computer hardware like Central Processing Units (CPUs), Random Access Memory (RAM), persistent data storage, bus interfaces, and data transceivers. NFV data communication system 100 comprises computer software like hypervisor, operating system, virtual machine, Virtual Network Function (VNF), Management and Orchestration (MANO), vProbe control, and packet header analysis. NFV data communication system 100 includes VNFs 101, virtual switching system 102, NFV hardware 103, multi-protocol vProbe 110, header analysis system 120, and probe control system 130.

Probe control system 130 receives protocol data correlated to header separation instructions from an operator, header analysis system 120, or some other computer system. The data communication protocols may include: Long Term Evolution, Session Initiation Protocol (SIP), General Packet Radio Service Transfer Protocol (GTP), Transmission Control Protocol (TCP), Internet Protocol (IP), and/or some other data communication format. The protocol data indicates the protocol and may specify version or some other attribute like destination address. The header separation instructions indicate the specific header data to retrieve. The header separation instructions may include start/stop data offsets from a known header boundary, start/stop byte counts from the start of the data packet, or bit masks with patterns that expose the desired data. The header separation instructions may also indicate destinations for the retrieved header data like IP addresses, Uniform Resource Identifiers (URIs) or MANO systems.

Probe control system 130 transfers the protocol data and the correlated header separation instructions to control agent 113 in vProbe 110. The link between probe control system 130 and control agent 113 comprises a multi-protocol vProbe Application Programming Interface (API). Control agent 113 receives the header separation instructions and the correlated protocol data. Control agent 113 loads the header separation instructions and the correlated protocol data into probe data structure 112.

VNFs 101 exchange data packets with virtual switching system 102. Virtual switching system 102 also exchanges data packets with external systems. Virtual switching system 102 forwards a copy of the data packets to packet-processing engine 111. For an individual data packet, packet-processing engine 111 identifies protocol data for the data packet. For example, packet-processing engine 111 may determine that a data packet is an IP version 6 packet with a specific IP prefix. Packet-processing engine 111 enters data structure 112 with the protocol data to yield the header separation instructions. Packet-processing engine 111 retrieves header data from the data packet based on the header separation instructions. For example, packet-processing engine 111 may use data offsets to retrieve the destination IP address and message type from a SIP message.

Packet-processing engine 111 transfers the retrieved header data based on the header separation instructions. For example, packet-processing engine 111 may transfer GTP headers for a given set of tunnels to a first IP address and transfer TCP headers from a given origination address to a second IP address. Other forwarding data like Uniform Resource Indicators (URIs) and network identifiers could be used. Header analysis system 120 receives and processes the header data to perform tasks like message counts, session set-up timers, and the like.

Referring to FIG. 2, the operation of NFV data communication system 100 is described. Probe control system 130 receives user inputs that indicate protocol data that is correlated to header separation instructions. The user inputs could be transferred from another data machine or input by an operator. Probe control system 130 transfers the header separation instructions and the correlated protocol data to vProbe 110. vProbe 110 loads the header separation instructions and the correlated protocol data into its data structure. The data structure may comprise a hash table integrated within packet-processing engine 111.

To deliver data communication services, VNFs 101 exchange data packets with virtual switching system 102. Virtual switching system 102 notifies the packet-processing engine 111 of the data packets to process. Packet-processing engine 111 identifies the protocol data for the individual data packets. Packet-processing engine 111 enters data structure 112 with the protocol data to yield the header separation instructions. Packet-processing engine 111 reads the data packet and retrieves header data from the data packet based on the header separation instructions. Packet-processing engine 111 transfers the retrieved header data to header analysis system 120 based a data destination address, name, or identifier in the header separation instructions. Header analysis system 120 receives and processes the header data to perform network tasks. For example, header analysis system 120 could process LTE S1-MME headers to determine the amount of live voice bearers on a per-eNodeB basis. Header analysis system 120 may determine and transfer new header separation instructions and the correlated protocol data to probe control system 130.

FIG. 3 illustrates data structure 300 to correlate protocol data with header processing instructions in a vProbe. Data structure 300 is exemplary and other data could be used. Data structure 300 has a column for protocol data. The protocol data could indicate an IP protocol, version, prefix, address, and port. The protocol data could indicate an Open Flow protocol, version, address, and message type. The protocol data could indicate a GTP protocol, version, and tunnel data. The protocol data could indicate SIP signaling, version, address, and message type. The protocol data could indicate LTE signaling including S1-MME, X2, S11, S15, Gz/Gy, Non-Access Stratum, Proxy Mobile Internet Protocol (PMIP), and Diameter. The protocol data could indicate an Ethernet protocol, version, address, VLAN ID, and port. The protocol data could indicate a TCP protocol, version, prefix, address, and port.

The protocol data is correlated to the header separation data by horizontal rows in data structure 300. Thus, IP address A is correlated to bitmask F in the top row. The header separation data may also indicate offsets or byte counts from a known reference point to identify start and stop points for header data retrieval. The protocol data is also correlated to the header forwarding data by the horizontal rows in data structure 300. Thus, IP address A is correlated to IP address A.B.C.D in the top row. Other forwarding data like URIs and VNF Manager (VNFM) IDs could be used. Data structure 300 is dynamically loaded and modified by a probe control system to change the data in data structure 300.

Figure 4:
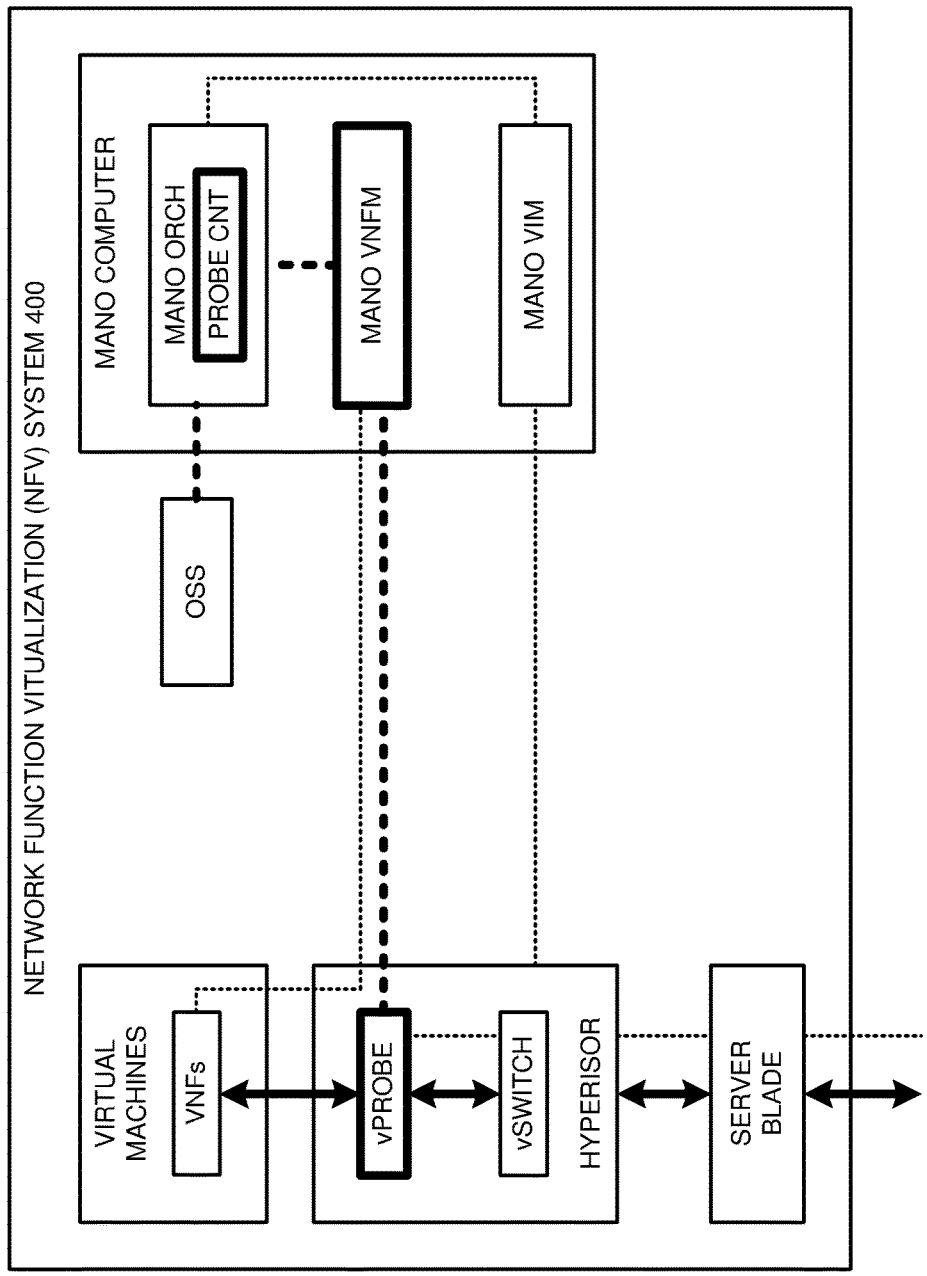
FIG. 4 illustrate an NFV Management and Orchestration (MANO) system that controls multi-protocol vProbes.

FIG. 4 illustrate NFV system 400 with Management and Orchestration (MANO) computer that controls multi-protocol vProbes. NFV system 400 is an example of NFV system 100, although NFV system 100 may vary from this example. NFV system 400 comprises a server blade that executes a hypervisor and virtual machines. The hypervisor includes a vProbe and a vSwitch. The virtual machines include VNFs. The vProbe is positioned on the hypervisor data path between the VNFs and the vSwitch. The data path may extend from the VNFs to the vSwitch and back. The data path may also extend from the VNFs to external systems through the vSwitch. The vProbe could be a hypervisor module or user space agent. In alternative examples, the vProbe could executed in a virtual machine like the VNFs.

NFV system 400 further comprises an NFV Management and Orchestration (MANO) computer. The MANO computer includes a MANO orchestrator, VNF Manager (VNFM), and Virtual Infrastructure Manager (VIM). The orchestrator includes a multi-protocol vProbe controller (CNT). The orchestrator is coupled an Operations Support System (OSS).

The OSS receives user inputs that indicate protocol data and correlated header separation instructions. The OSS transfers the protocol data and the correlated header separation instructions to the vProbe controller in the MANO orchestrator. The MANO orchestrator drives the MANO VNFM to transfer the protocol data and the correlated header separation instructions to the vProbe. The vProbe loads the protocol data and the correlated header separation instructions into its packet-processing engine hash table. For example, the OSS may provide IP prefix protocol data and a header separation bitmask to retrieve destination IP port numbers from data packets with the IP prefix To deliver data communication services, the VNFs exchange data packets with the vSwitch. The hypervisor directs the data packets (or a copy) to the multi-protocol vProbe. A packet-processing engine in the vProbe identifies protocol data for the data packets and enters its hash table with the protocol data to obtain the correlated header separation instructions. The packet-processing engine retrieves header data from the data packet based on the header separation instructions. The vProbe then transfers the retrieved header data to an external header analysis system (not shown) over the vSwitch and server blade based a destination IP address in the header separation instructions.

The multi-protocol vProbe may be dynamically controlled to perform header separation and forwarding operations for various protocols and their metadata including: IP, TCP, Open Flow, GTP, SIP, LTE, Non-Access Stratum, PMIP, and Diameter. The metadata may indicate version, address, port, tunnel, user ID, and the like.

Figure 5:
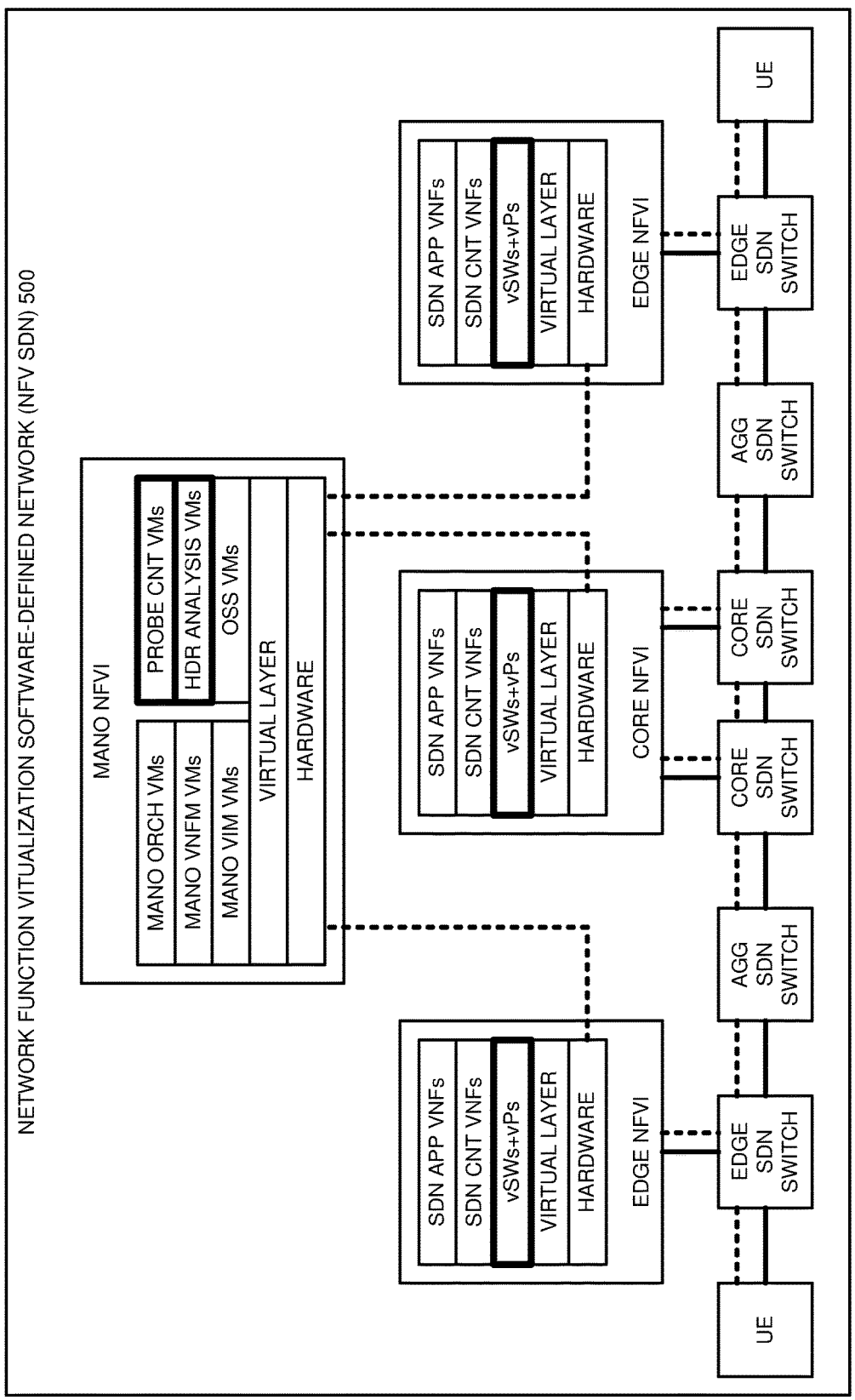
FIG. 5 illustrates a Network Function Virtualization (NFV) Software Defined Network (SDN) that has multi-protocol vProbes.

FIG. 5 illustrates Network Function Virtualization (NFV) Software Defined Network (SDN) 500 that has multi-protocol vProbes. NFV SDN 500 is an example of NFV data communication system 100, although system 100 may use alternative configurations and operations. NFV SDN 500 comprises: User Equipment (UE), edge SDN switches, aggregation (AGG) SDN switches, core SDN switches, edge NFVIs, a core NFVI, and a MANO NFVI. The NFVIs comprise hardware such as server blades with CPU cores, data memories, I/O transceivers, and the like. The edge SDN switches may include wireless base station VNFs that drive nearby wireless transceivers to exchange wireless data with the UEs.

The NFVIs execute virtual layer software to provide a virtualized processing environment. The virtual layer comprises virtual hardware interfaces, hypervisors, and NFVI controllers. Under the control of the MANO system, the virtual layers support various SDN VNFs. In the edge and core NFVIs, the virtual layers support NFV virtual switches (vSWs), virtual Probes (vPs), SDN controller (CNT) VNFs, and SDN application (APP) VNFs. In the MANO NFVI, the virtual layer supports MANO vSWs, Virtual Infrastructure Manager (VIM) Virtual Machines (VMs), VNF Manager (VNFM) VMs, MANO Orchestration (ORCH) VMs, OSS VMs, header analysis VMs, and probe controller VMs.

Under the direction of the MANO ORCH VMs, the VIM and VNFM VMs transfer networking data to the edge and core virtual layers to drive the execution of the SDN APP and CNT VNFs. To set-up a data session between the UEs, one of the UEs transfers a session request to an SDN application VNF. The SDN application VNF informs other SDN application VNFs to extend the session. The SDN VNFs transfer SDN controller API calls for the UE session to their associated UE SDN controller VNFs. The UE SDN controller VNFs transfer SDN data machine API calls to the SDN switches.

API responses flow back to from the SDN switches to the SDN controller VNFs and to the SDN application VNFs. If needed, an SDN application VNF may direct an SDN controller VNF to drive an SDN data machine to deliver user data to an NFVI for heavier processing by the NFV vSWs and data-processing VNFs. For example, a given flow may be directed to a VNF to perform packet inspection, encryption, or the like.

The OSS VMs receive user inputs that indicate protocol data and correlated header separation instructions. The OSS VMs transfer the protocol data and the correlated header separation instructions to the vProbe controller VMs. The vProbe controller VMs transfer the protocol data and the correlated header separation instructions to the MANO orchestrator VMs. The MANO orchestrator VMs drive the MANO VNFM VMs to transfer the protocol data and the correlated header separation instructions to the vProbes in the NFVIs. The vProbes load the protocol data and the correlated header separation instructions into their hash tables.

To deliver data communication services, the VNF VMs exchange data packets with the vSwitches. The virtual layers direct the data packets (or a copy) to the multi-protocol vProbes. The vProbes identify protocol data for the data packets and enter their hash tables with the protocol data to obtain the correlated header separation instructions. The vProbes retrieve header data from the data packets based on the header separation instructions. The vProbes then transfer the retrieved header data to the header analysis VMs in the MANO NFVI based a destination address in the header separation instructions. The header analysis VMs process the header data to perform various tasks. For example, a header analysis VM may identify amounts of Open Flow traffic by message type for each SDN application VNF and SDN controller VNF. Another header analysis VM may identify an amount of File Description Table (FDT) updates per SDN controller VNF-SDN data switch pair.

Figure 6:
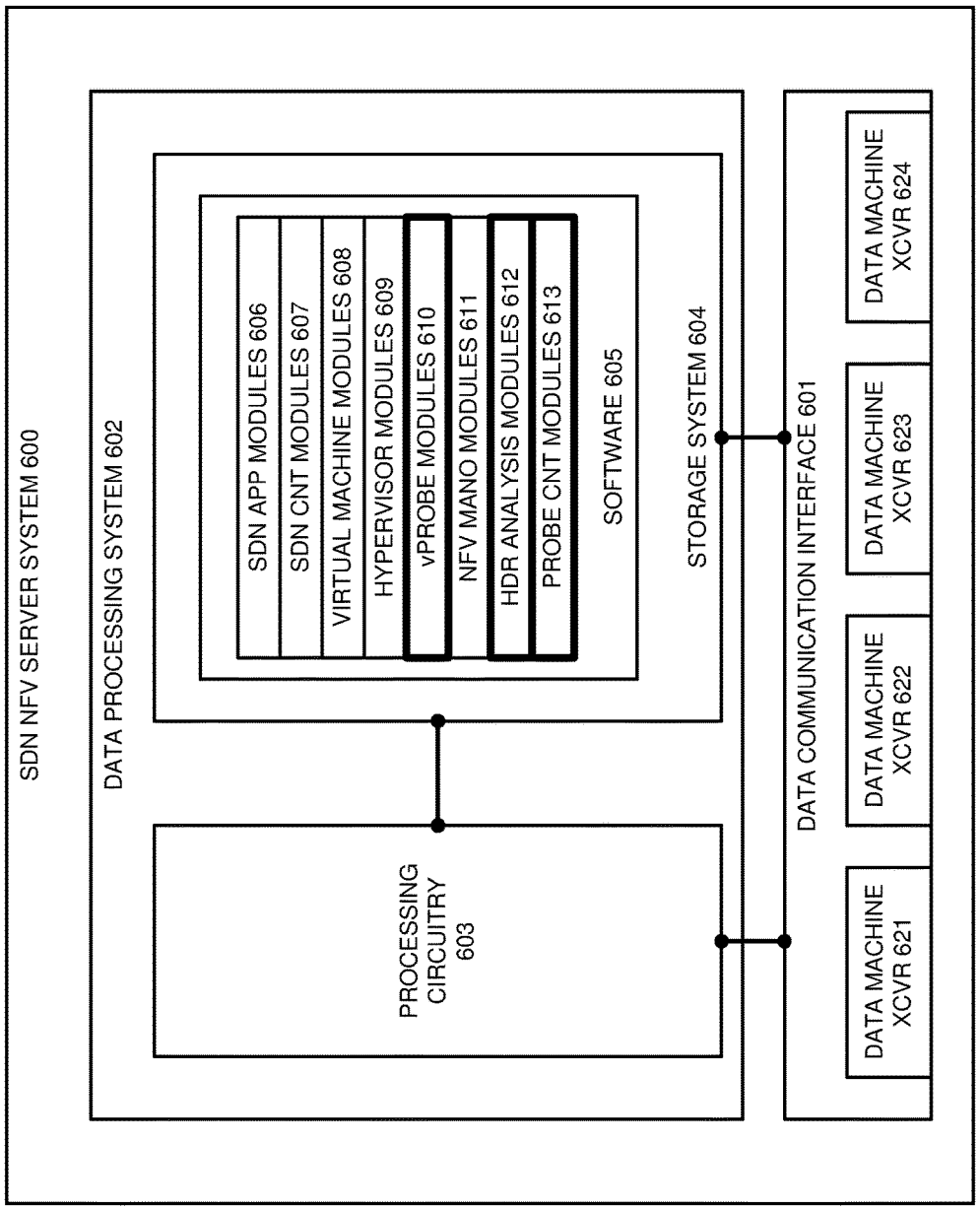
FIG. 6 illustrates a Software Defined Network (SDN) Network Function Virtualization (NFV) server system that has multi-protocol vProbes.

FIG. 6 illustrates Software Defined Network (SDN) Network Function Virtualization (NFV) server system 600 that has multi-protocol vProbes. SDN NFV server system 600 is an example of NFV SDN 100, although network 100 may use alternative configurations and operations. SDN NFV server system 600 comprises data communication interface 601 and data processing system 602. Data communication interface 601 comprises data machine transceivers 621-624. Data processing system 602 comprises processing circuitry 603 and storage system 604. Storage system 604 stores software 605. Software 605 includes respective software modules 606-613.

Data machine transceivers 621-624 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. SDN NFV server system 600 may be centralized or distributed. All or portions of software 606-613 may be externally stored on one or more storage media, such as circuitry, discs, and the like. Some conventional aspects of SDN NFV server system 600 are omitted for clarity, such as power supplies, enclosures, and the like.

When executed by processing circuitry 603, software modules 606-613 direct circuitry 603 to perform the following operations. SDN application modules 606 process user and network data to drive SDN controller modules 608 to deliver data communication services to users. SDN controller modules 609 process the SDN controller API calls to generate SDN data machine API calls to drive SDN data machines to deliver data communication services to users. Virtual machine modules 608 support SDN application and controller modules 606-607.

Hypervisor modules 609 have hardware drivers, operating system kernels, virtual network modules, and user space agents. The virtual network modules comprise virtual switches that exchange the SDN application and controller API calls among virtual machine modules 608 and SDN data machines. The vSW modules also point vProbe modules 610 to the SDN API traffic in memory.

vProbe modules 610 receive protocol data correlated to header separation instructions from probe control modules 613. vProbe modules 610 process data packets based on the protocol data and correlated header separation instructions to transfer select header data to header analysis modules 612. NFV MANO modules 611 include orchestrators, VNFMs, and VIMs to direct NFVI operations—including vProbe control. Header analysis modules 612 process the header data to perform network tasks. Probe control modules 613 process OSS instructions to transfer protocol data and correlated to header separation instructions to vProbe modules 610.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) data communication system to control a virtual probe, the method comprising:
   an NFV Management and Orchestration (MANO) computer system receiving first protocol data correlated to first header separation instructions and transferring the first header separation instructions and the first correlated protocol data to a control agent in the virtual probe in an NFV Infrastructure (NFVI), wherein the header separation instructions comprise data offsets from a header boundary that indicate the header data to retrieve;
   the NFV MANO computer system receiving second protocol data correlated to second header separation instructions and transferring the second header separation instructions and the second correlated protocol data to the control agent in the virtual probe in the NFVI;
   the control agent circuitry in the virtual probe receiving the first header separation instructions with the first correlated protocol data and the second separation instructions with the second correlated protocol data and loading each the first header separation instructions with the first correlated protocol data and the second separation instructions with the second correlated protocol data into a probe data structure;
   a packet-processing engine circuitry in the virtual probe receiving a first data packet from an NFV switching system, identifying first protocol data for the first data packet, using the probe data structure with the first protocol data to yield the first header separation instructions, retrieving first header data from the first data packet based on the first header separation instructions, and transferring the first retrieved header data based on the first header separation instructions; and
   the packet-processing engine circuitry in the virtual probe receiving a second data packet from the NFV switching system, identifying second protocol data for the second data packet, using the probe data structure with the second protocol data to yield the second header separation instructions, retrieving second header data from the second data packet based on the second header separation instructions, and transferring the second retrieved header data based on the second header separation instructions.

2. The method of claim 1 wherein at least one of the first header separation instructions and the second header separation instructions further comprise a bit mask that indicates the header data to retrieve.

3. The method of claim 1 wherein at least one of the first header separation instructions and the second header separation instructions further comprise byte counts from a data packet boundary that indicate the header data to retrieve.

4. The method of claim 1 wherein one of the first protocol data and the second protocol data comprises Long Term Evolution signaling.

5. The method of claim 1 wherein one of the first protocol data and the second protocol data comprises Session Initiation Protocol (SIP) signaling.

6. The method of claim 1 wherein one of the first protocol data and the second protocol data comprises General Packet Radio Service Transfer Protocol (GTP) data.

7. The method of claim 1 wherein one of the first protocol data and the second protocol data comprises Transmission Control Protocol (TCP) data.

8. The method of claim 1 wherein one of the first protocol data and the second protocol data comprises Internet Protocol data.

9. A Network Function Virtualization (NFV) data communication system to control a virtual probe, the NFV data communication system comprises:
   an NFV Management and Orchestration (MANO) computer system configured to receive first protocol data correlated to first header separation instructions and transfer the first header separation instructions and the first correlated protocol data to a control agent in the virtual probe in an NFV Infrastructure (NFVI), wherein the header separation instructions comprise data offsets from a header boundary that indicate the header data to retrieve;
   the NFV MANO computer system configured to receive second protocol data correlated to second header separation instructions and transfer the second header separation instructions and the second correlated protocol data to the control agent in the virtual probe in the NFVI;
   the control agent circuitry in the virtual probe configured to receive the first header separation instructions with the first correlated protocol data and the second separation instructions with the second correlated protocol data and load each the first header separation instructions with the first correlated protocol data and the second separation instructions with the second correlated protocol data into a probe data structure;
   a packet-processing engine circuitry in the virtual probe configured to receive a first data packet from an NFV switching system, identify first protocol data for the first data packet, use the probe data structure with the first protocol data to yield the first header separation instructions, retrieve first header data from the first data packet based on the first header separation instructions, and transfer the first retrieved header data based on the first header separation instructions; and
   the packet-processing engine circuitry in the virtual probe configured to receive a second data packet from the NFV switching system, identify second protocol data for the second data packet, use the probe data structure with the second protocol data to yield the second header separation instructions, retrieve second header data from the second data packet based on the second header separation instructions, and transfer the second retrieved header data based on the second header separation instructions.

10. The NFV data communication system of claim 9 wherein at least one of the first header separation instructions and the second header separation instructions further comprise a bit mask that indicates the header data to retrieve.

11. The NFV data communication system of claim 9 wherein at least one of the first header separation instructions and the second header separation instructions further comprise byte counts from a data packet boundary that indicate the header data to retrieve.

12. The NFV data communication system of claim 9 wherein one of the first protocol data and the second protocol data comprises Long Term Evolution signaling.

13. The NFV data communication system of claim 9 wherein one of the first protocol data and the second protocol data comprises Session Initiation Protocol (SIP) signaling.

14. The NFV data communication system of claim 9 wherein one of the first protocol data and the second protocol data comprises General Packet Radio Service Transfer Protocol (GTP) data.

15. The NFV data communication system of claim 9 wherein one of the first protocol data and the second protocol data comprises Transmission Control Protocol (TCP) data.

16. The NFV data communication system of claim 9 wherein one of the first protocol data and the second protocol data comprises Internet Protocol data.

\* \* \* \* \*